(12) United States Patent
Thomassin et al.

(10) Patent No.: US 10,280,830 B2
(45) Date of Patent: May 7, 2019

(54) SYSTEM FOR PILOT SUBCHAMBER TEMPERATURE CONTROL

(71) Applicant: Pratt & Whitney Canada Corp., Longueuil (CA)

(72) Inventors: Jean Thomassin, Ste-Julie (CA); Edwin Schulz, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1101 days.

(21) Appl. No.: 13/789,989

(22) Filed: Mar. 8, 2013

(65) Prior Publication Data

US 2014/0251258 A1 Sep. 11, 2014

(51) Int. Cl.
| | |
|---|---|
| F02B 53/10 | (2006.01) |
| F02B 19/12 | (2006.01) |
| F02B 19/10 | (2006.01) |
| F02D 35/02 | (2006.01) |
| F02D 41/30 | (2006.01) |
| F02D 41/40 | (2006.01) |
| F02D 41/04 | (2006.01) |
| F02D 41/14 | (2006.01) |

(52) U.S. Cl.
CPC .......... *F02B 19/12* (2013.01); *F02B 19/1085* (2013.01); *F02B 53/10* (2013.01); *F02D 35/025* (2013.01); *F02D 41/045* (2013.01); *F02D 41/3094* (2013.01); *F02D 41/403* (2013.01); *F02D 2041/141* (2013.01); *F02D 2200/501* (2013.01); *Y02T 10/17* (2013.01)

(58) Field of Classification Search
CPC ...... F02B 19/12; F02B 19/1085; F02B 53/10; F02D 35/025; F02D 41/3094; F02D 41/403; F02D 41/045; F02D 2041/14; F02D 2200/501; F01C 1/3446
USPC .................................................. 123/205, 200
See application file for complete search history.

(56) References Cited

U.S. PATENT DOCUMENTS

| | | | |
|---|---|---|---|
| 780,023 A | 1/1905 | Clegg | |
| 3,861,361 A * | 1/1975 | Klomp | F02B 53/02 123/209 |
| 4,089,305 A * | 5/1978 | Gregg | F01C 1/356 123/244 |
| 4,259,932 A | 4/1981 | Hideg et al. | |
| 4,518,268 A | 5/1985 | Swis et al. | |
| 5,979,395 A | 11/1999 | Mallen et al. | |

(Continued)

FOREIGN PATENT DOCUMENTS

| | | | |
|---|---|---|---|
| DE | 3108087 A1 * | 9/1982 | F01C 1/3446 |
| EP | 2009268 | 12/2008 | |

(Continued)

*Primary Examiner* — Thai Ba Trieu
(74) *Attorney, Agent, or Firm* — Norton Rose Fulbright Canada LLP

(57) ABSTRACT

There is described a system and method for controlling a temperature in the subchamber of a rotary engine. At least one first measurement of at least one engine operating parameter and a second measurement indicative of a present temperature in the subchamber are received. A setpoint for the temperature in the subchamber is computed from the at least one first measurement. In response to the second measurement, at least one control signal indicative of a request to adjust the present temperature towards the setpoint is generated and sent to the engine.

20 Claims, 4 Drawing Sheets

(56) References Cited

U.S. PATENT DOCUMENTS

| | | | |
|---|---|---|---|
| 6,125,813 A * | 10/2000 | Louthan | F01C 1/22 |
| | | | 123/209 |
| 6,162,034 A | 12/2000 | Mallen | |
| 6,244,240 B1 | 6/2001 | Mallen | |
| 6,321,713 B1 | 11/2001 | Mallen | |
| 6,435,851 B2 | 8/2002 | Mallen | |
| 6,606,973 B2 * | 8/2003 | Moe | F02B 53/04 |
| | | | 123/228 |
| 7,370,626 B2 * | 5/2008 | Schubert | F02D 41/3094 |
| | | | 123/209 |
| 9,638,093 B2 | 5/2017 | Blank | |
| 9,664,047 B2 | 5/2017 | McDaniel et al. | |
| 2004/0123849 A1 * | 7/2004 | Bryant | F01B 7/12 |
| | | | 123/563 |
| 2016/0146009 A1 * | 5/2016 | Fanara | F02B 53/10 |
| | | | 123/200 |

FOREIGN PATENT DOCUMENTS

| | | |
|---|---|---|
| JP | 2005240712 | 9/2005 |
| JP | 2009007966 | 1/2009 |
| WO | 2008043154 | 4/2008 |

* cited by examiner

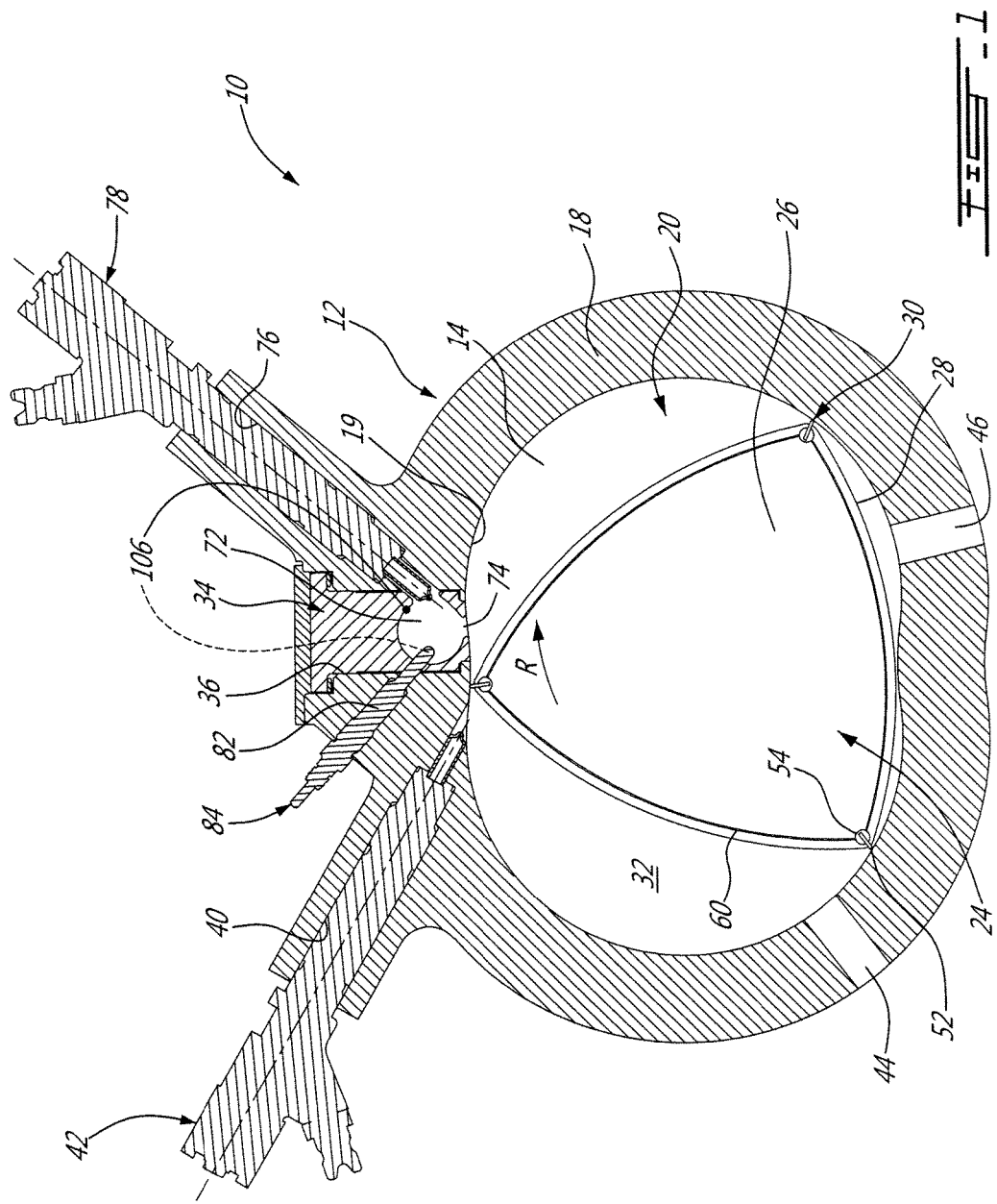

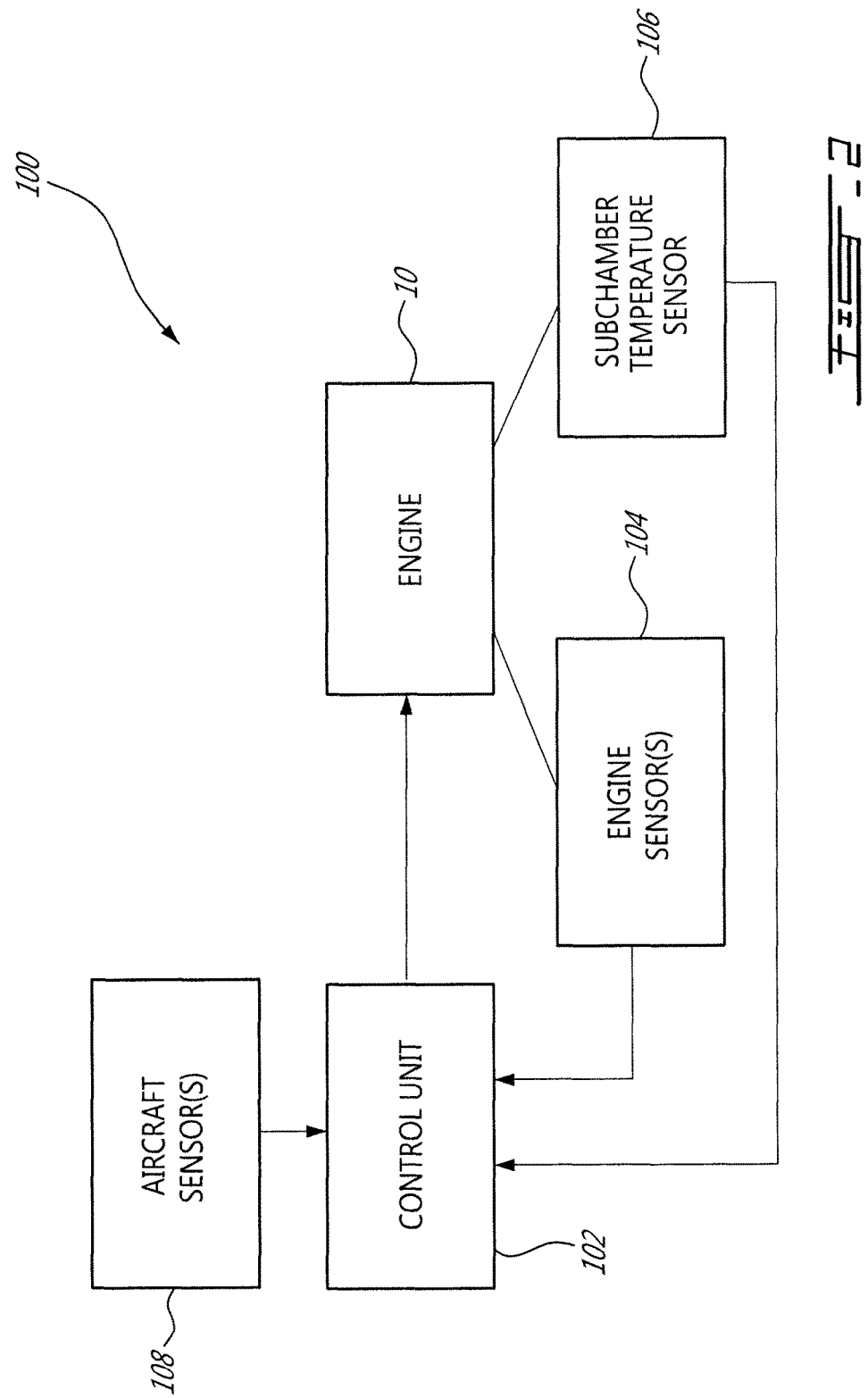

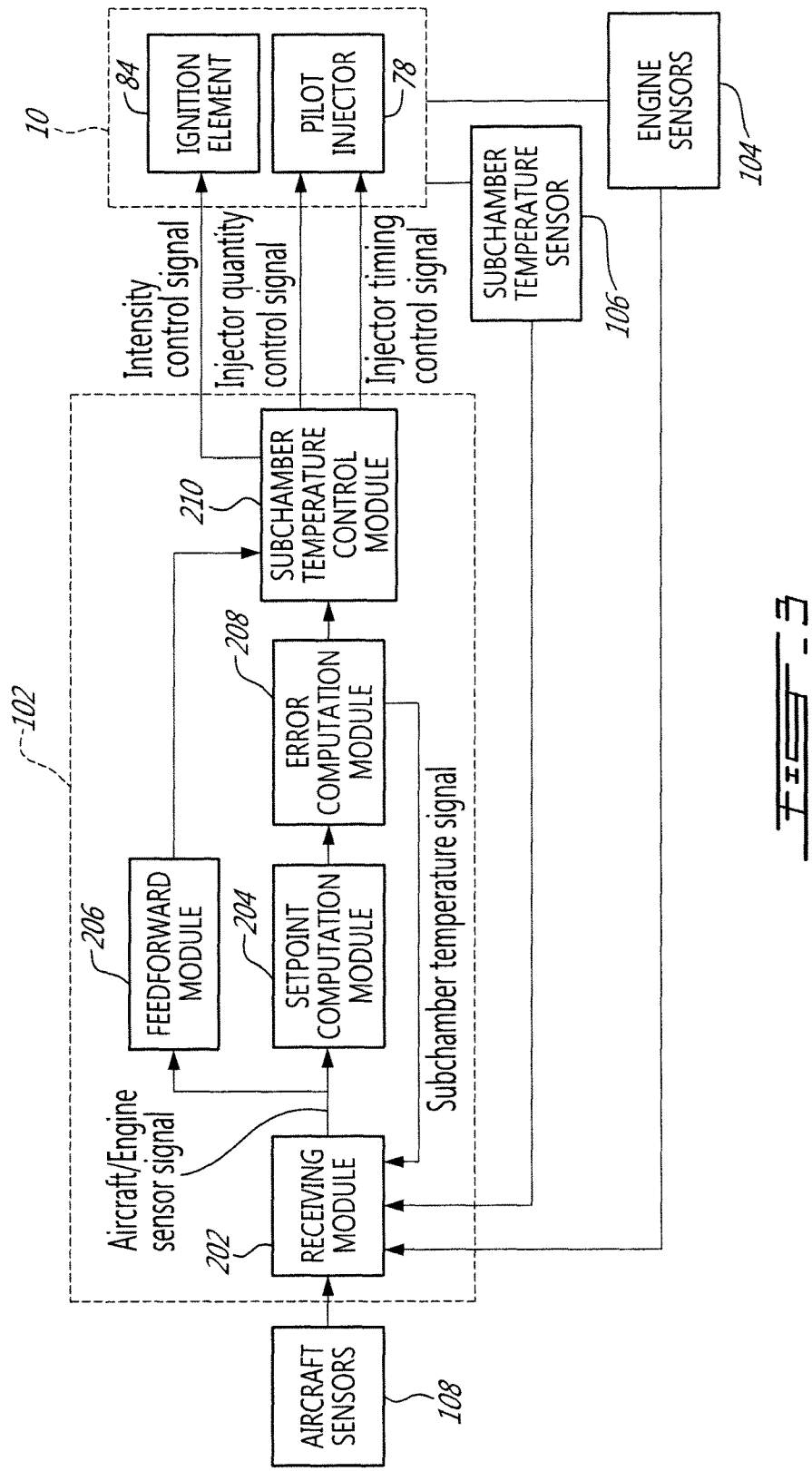

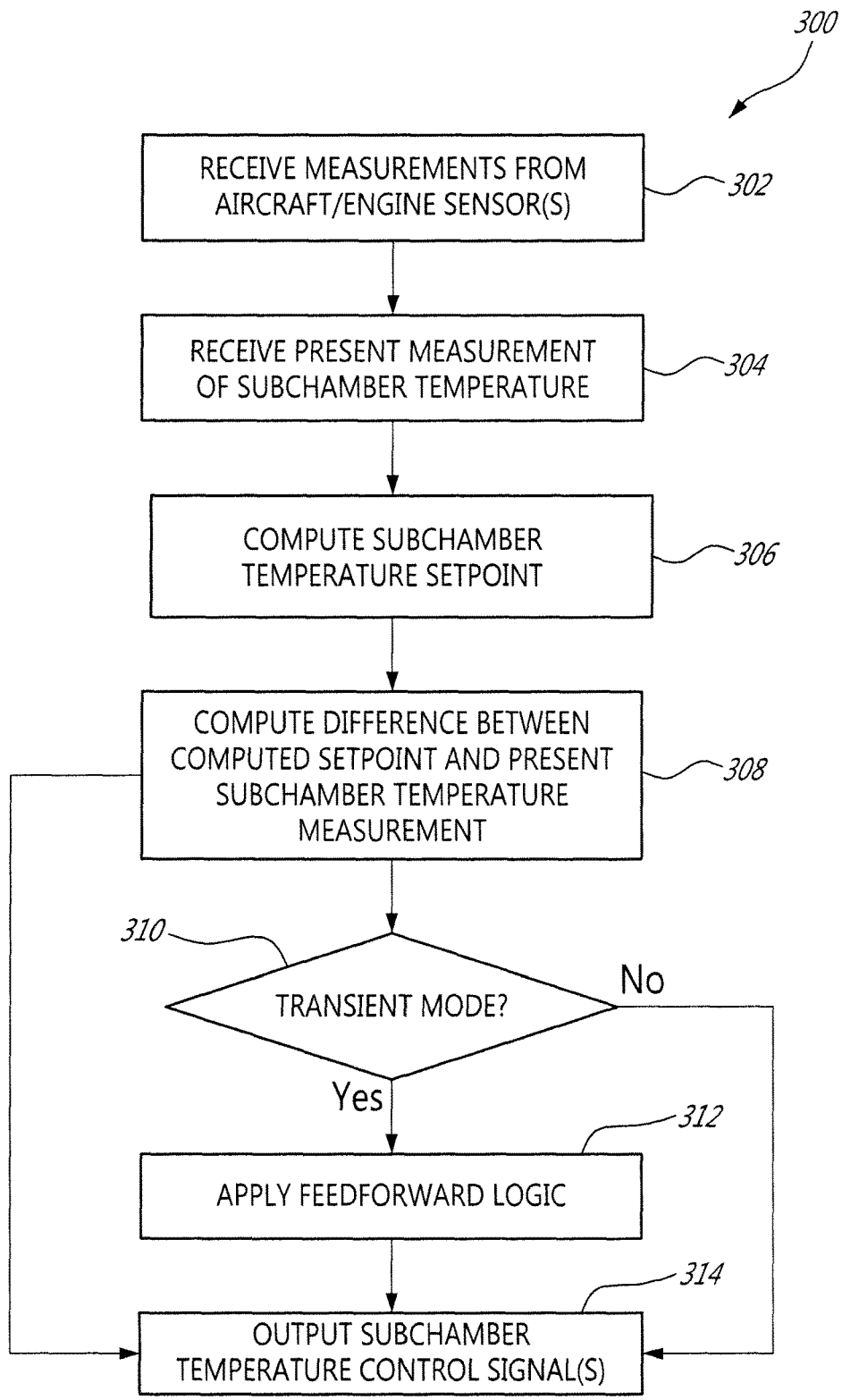

SYSTEM FOR PILOT SUBCHAMBER TEMPERATURE CONTROL

TECHNICAL FIELD

The application relates generally to rotary internal combustion engines and, more particularly, to control of a subchamber temperature in such engines.

BACKGROUND OF THE ART

Rotary internal combustion engines use the rotation of a piston to convert pressure into a rotating motion. In these engines, the rotor typically includes a number of seals that remain in contact with a wall of the rotor cavity of the engine throughout the rotational motion of the rotor to create a plurality of rotating chambers when the rotor rotates. One well-known type, the Wankel engine, has a generally triangular rotor received in a two-lobed epitrochoid cavity. Other rotary engines types exist as well.

Some internal combustion engines, including some rotary engines, include a pilot subchamber for pilot ignition. However, known arrangements are not optimized, in terms of combustion arrangements and characteristics, and thus room for improvement exists.

SUMMARY

In one aspect, there is provided a system for controlling a temperature in a pilot subchamber for pilot injection of fuel in an internal combustion engine, the system comprising: a receiving unit adapted to receive at least one first measurement of at least one engine operating parameter, and receive a second measurement of a present temperature in the subchamber; and a processing unit adapted to compute from the at least one first measurement a setpoint for the temperature in the subchamber, generate in response to the second measurement at least one control signal indicative of a request to adjust the present temperature towards the setpoint, and send the at least one control signal to the engine.

In another aspect, there is provided a method for controlling a temperature in a pilot subchamber for pilot injection of fuel in an internal combustion engine, the method comprising: receiving at least one first measurement of at least one engine operating parameter; receiving a second measurement of a present temperature in the subchamber; computing from the at least one first measurement a setpoint for the temperature in the subchamber; generating in response to the second measurement at least one control signal indicative of a request to adjust the present temperature towards the setpoint; and sending the at least one control signal to the engine.

In a further aspect, there is provided a system for controlling a temperature in a pilot subchamber for pilot injection of fuel in an internal combustion engine, the system comprising: means for receiving at least one first measurement of at least one engine operating parameter; means for receiving a second measurement of a present temperature in the subchamber; means for computing from the at least one first measurement a setpoint for the temperature in the subchamber; means for generating in response to the second measurement at least one control signal indicative of a request to adjust the present temperature towards the setpoint; and means for sending the at least one control signal to the engine.

DESCRIPTION OF THE DRAWINGS

Reference is now made to the accompanying figures in which:

FIG. 1 is a schematic cross-sectional view of a rotary internal combustion engine in accordance with a particular embodiment;

FIG. 2 is schematic diagram of a system for control of the temperature of a pilot subchamber of a rotary engine such as shown in FIG. 1, in accordance with an illustrative embodiment;

FIG. 3 is a more detailed schematic diagram of the control system of FIG. 2; and FIG. 4 is a flowchart of a method for control of the subchamber temperature of the engine, in accordance with an illustrative embodiment.

DETAILED DESCRIPTION

Referring to FIG. 1, a rotary internal combustion engine 10 known as a Wankel engine is schematically shown. In a particular embodiment, the rotary engine 10 is used in a compound cycle engine system such as described in Lents et al.'s U.S. Pat. No. 7,753,036 issued Jul. 13, 2010, as described in Julien et al.'s U.S. Pat. No. 7,775,044 issued Aug. 17, 2010, or as described in U.S. patent application Ser. Nos. 13/554,517 and 13/554,564 both filed Jul. 20, 2012, the entire contents of all of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used with a turbocharger without being compounded; in another embodiment, the rotary engine 10 is used without a turbocharger, with air at atmospheric pressure, as a stand-alone engine. In one embodiment, the rotary engine 10 may be applicable to land base systems including, but not limited to, generators.

The engine 10 comprises an outer body 12 having axially-spaced end walls 14 with a peripheral wall 18 extending therebetween to form a rotor cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 and a generally triangular profile with outwardly arched sides. The apex portions 30 are in sealing engagement with the inner surface of peripheral wall 18 to form three rotating working chambers 32 between the inner rotor 24 and outer body 12. A recess (not shown) is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the rotor cavity. The shaft rotates three times for each complete rotation of the rotor 24 as it moves around the rotor cavity 20. Oil seals are provided around the phasing gear to prevent leakage flow of lubricating oil radially outwardly thereof between the respective rotor end face 26 and outer body end wall 14.

At least one inlet port 44 is defined through one of the end walls 14 or the peripheral wall 18 for admitting air (atmospheric or compressed) into one of the working chambers 32, and at least one exhaust port 46 is defined through one of the end walls 14 or the peripheral wall 18 for discharge of the exhaust gases from the working chambers 32. The inlet and exhaust ports 44, 46 are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, the inlet and exhaust ports 44, 46 are arranged such that the rotary engine 10 operates under the principle of the Miller or Atkinson cycle, with its volumetric compression ratio lower than its volumetric expansion ratio. In another embodiment, the inlet and exhaust ports 44, 46 are arranged such that the volumetric compression and expansion ratios are equal or similar to one another.

The engine 10 includes a pilot subchamber 72 defined in the outer body 12, for pilot fuel injection and ignition. In the embodiment shown, the pilot subchamber 72 is provided in an insert 34 received in a corresponding hole 36 defined through the peripheral wall 18 of the outer body 12. The insert 34 is retained to the peripheral wall 18 using any adequate type of connection, including, but not limited to, fasteners, welding, brazing, retention through a cover overlapping the insert 34 and connected to the peripheral wall 18, etc. In another embodiment, the pilot subchamber 72 is directly defined in the peripheral wall 18.

In the embodiment shown, the insert body 34 has the entire pilot subchamber 72 defined therein, shown here with a circular cross-section. Other geometries are also possible, including but not limited to cylindrical, conical, frustoconical, wedge-shaped profiles, etc. The insert 34 includes at least one outlet opening 74 defined therein for communication with the cavity 20, and the subchamber 72 has a shape forming a reduced cross-section adjacent the opening(s) 74, such that the opening(s) 74 define a restriction to the flow between the subchamber 72 and the cavity 20. The opening(s) 74 may have various shapes and/or be defined by a pattern of multiple holes.

The particular insert 34 shown is provided only as an example, and it is understood that other geometries and/or positions within the peripheral wall 18 are possible for the insert 34. In a particular embodiment, the insert 34 is made of a material having a greater high temperature properties and/or lower thermal conductivity than that of the peripheral wall 18, which may be for example made of aluminum. In one embodiment, the insert 34 is made of a nickel or cobalt based super alloy. Alternately, as mentioned above, the insert 34 may be omitted and the pilot subchamber 72 be directly defined in the peripheral wall 18 if the peripheral wall 18 is made of a material having sufficient heat resistance and adequate high temperature properties to resist the high temperatures within the subchamber 72.

The peripheral wall 18 has a main injector elongated hole 40 defined therethrough, in communication with the rotor cavity 20 and spaced apart from the pilot subchamber 72. A main fuel injector 42 is received and retained within this corresponding hole 40, with the tip of the main injector 42 communicating with the cavity 20 at a point spaced apart from the pilot subchamber 72. The main injector 42 is located rearwardly of the pilot subchamber 72 with respect to the direction R of the rotor rotation and revolution, and is angled to direct fuel forwardly into each of the rotating chambers 32 sequentially with a tip hole pattern designed for an adequate spray.

The peripheral wall 18 also has a pilot injector elongated hole 76 defined therethrough in communication with the subchamber 72. A pilot fuel injector 78 is received and retained within the corresponding hole 76, with the tip of the pilot injector 78 being in communication with the subchamber 72, for example by terminating in a corresponding opening defined in the insert 34 between the subchamber 72 and the pilot injector hole 76.

The pilot injector 78 and main injector 42 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

The peripheral wall 18 and, in the embodiment shown, insert body 34 have an ignition element elongated hole 82 defined therein in communication with the subchamber 72. An ignition element 84 is received and retained within the corresponding hole 82 and positioned to ignite fuel within the subchamber 72, e.g. with the tip of the ignition element 84 being received in the subchamber 72. In the embodiment shown, the ignition element 84 is a glow plug. Other configurations are also possible, including for example having the ignition element 84 completely received within the insert 34, and/or ignition element(s) 84 of any other adequate type, including but not limited to plasma ignition, laser ignition, spark plug, microwave, other types of ignition elements, etc.

Referring now to FIG. 2, a control system 100 for the subchamber temperature of the engine 10 will now be described. The system 100 may be used to control the ignition of the engine 10 and more particularly to maintain the temperature in the subchamber 72 at a level sufficient to cause ignition. Still, it should be understood that the system 100 may be used for other applications. The system 100 comprises a control unit 102, which is coupled to the engine 10 as well as to engine sensors 104, and a subchamber temperature sensor 106. The control unit 102 may comprise a digital computer or Engine Control Unit (ECU) (not shown) using a Central Processing Unit (CPU) (not shown).

In an embodiment where the engine 10 is used in a compound engine in an aircraft where air is compressed by a compressor before entering the engine 10 and the engine 10 drives one or more turbine(s) of the compound engine, the system 100 may further include aircraft sensors 108. The aircraft sensors 108 may be used to measure operating parameters of the aircraft (not shown) the engine 10 is coupled to. The aircraft sensors 108 may comprise a speed sensor, a pressure sensor, or any other suitable instrument known to those skilled in the art for providing information about the aircraft's flight situation. In one embodiment, the aircraft sensors 108 may provide a measurement of the aircraft's speed (e.g. Mach number).

The engine sensors 104 may be used to measure the engine's operating parameters and illustratively comprise at least one of a pressure sensor and/or a temperature sensor for respectively measuring a pressure and/or a temperature near or at the engine's inlet port 44 (e.g., in a conduit providing fluid communication between the compressor and the inlet port 44). A speed sensor may also be used to measure a speed of rotation of the rotor 24 of the engine 10. It should be understood that other sensors may apply.

The subchamber temperature sensor 106 may be used to take a measurement indicative of a present temperature in the subchamber 72 of the engine 10. For this purpose, the subchamber temperature sensor 106 may be positioned in the pilot subchamber 72 or alternatively be coupled to the wall delimiting the subchamber 72. In a particular embodiment where the temperature sensor 106 is adapted to measure the gas temperature in the subchamber 72, the temperature sensor 106 may be an integral part a portion of the ignition element 84 (e.g. glow plug) received in the subchamber 72. In a particular embodiment where the temperature sensor 106 is adapted to measure the wall temperature of the subchamber 72, the temperature sensor 106 may be provided as a thermocouple coupled to the metal wall. As such, the subchamber temperature measurement acquired by the sensor 106 may be the gas temperature in the subchamber 72 or the material temperature of the subchamber's wall. In another embodiment, the measurement acquired by the sensor 106 may be another measurement indicative of the subchamber temperature, including, but not limited to, a temperature of the insert 34.

As will be described further below, upon receiving the measurements from the sensors 104, 106, 108, the control unit 102 may determine therefrom the value of the subchamber temperature that should be achieved for optimal operation of the engine 10. The control unit 102 may then output to the engine 10 at least one control signal for causing the subchamber temperature to be adjusted towards the optimal value. For instance, the at least one control signal output by the control unit 102 may be representative of a command for adjusting an intensity of the ignition element 84. Alternatively, the control signal may be a request for the pilot injector 78 to inject with a certain timing a given quantity of fuel into the subchamber 72. In this manner, the temperature of the subchamber 72 can be accurately controlled.

Referring to FIG. 3, the control unit 102 illustratively comprises a receiving module 202, a setpoint computation module 204, an optional feedforward module 206, an error computation module 208, and a subchamber temperature control module 210. The readings from the engine sensors 104, the subchamber temperature sensor 106, and, if applicable, the aircraft sensors 108 may be received at the receiving module 202. The receiving module 202 may then send a signal comprising the received sensor readings to the setpoint computation module 204. From the received signal, the setpoint computation module 204 may compute a target value, i.e. the setpoint, of the subchamber temperature, which the subchamber temperature control module 208 should aim to reach. The value of the setpoint may be adjusted according to the operating parameters of the engine 10 and, if applicable, of the aircraft (not shown) as received from the engine sensors 104 and, if applicable, the aircraft sensors 108. For instance, it may be desirable to achieve a first subchamber temperature setpoint for a first set of pressure, temperature, and rotation speed readings of the engine 10 while it may be desirable to achieve a second subchamber temperature setpoint for a second set of pressure, temperature, and rotation speed readings. For example, the setpoint may be provided as a map or table with relation to one or more of pressure, temperature, and rotation speed readings. It should be understood that the subchamber temperature control module 208 may alternatively set the value of the setpoint to a predetermined value, e.g. 1000° F.

The setpoint value output by the setpoint computation module 204 is then sent to the error computation module 208, which may further receive from the receiving module 202 a subchamber temperature signal comprising a present measurement from the subchamber temperature sensor 106. The error computation module 208 may then compute a difference between the computed setpoint and the present subchamber temperature measurement. The value of the difference is then sent to the subchamber temperature control module 210, which may generate on the basis thereof at least one control signal indicative of a request to adjust the subchamber temperature. In particular, the subchamber temperature control module 210 may determine from the difference received from the error computation module 208 the adjustment required for adjusting the subchamber temperature towards the setpoint.

The subchamber temperature control module 210 may then determine at least one engine component whose operation may modified to achieve the desired adjustment. The subchamber temperature control module 210 may accordingly generate a control signal for commanding the engine component in question to perform the adjustment. In one embodiment, the subchamber temperature control module 210 may indeed generate at least one of an intensity control signal, an injector quantity control signal, and an injector timing control signal. The intensity control signal may be output to the ignition element 84 for causing a desired adjustment, e.g. an increase or a decrease in a heating intensity of the ignition element 84 when the ignition element 84 is heatable (e.g. glow plug or other heating element), a change in timing and/or energizing time of the ignition element 84 (eg. plasma ignition, laser ignition, spark plug). This may in turn vary, i.e. increase or decrease, the temperature in the subchamber 72 towards the setpoint. The injector quantity control signal may further be output to the pilot injector 78 for causing the latter to adjust the quantity of fuel it injects into the subchamber 72 in each injection pulse, thereby modify the subchamber temperature accordingly. The injector timing control signal may also be output to the pilot injector 78 for controlling the timing of the fuel injection by the pilot injector 78 to further modify the subchamber temperature. For example, in a particular embodiment, the temperature in the subchamber 72 may be increased by increasing the quantity of fuel injected by the pilot injector 78, timing the pilot injection so that it happens earlier in the combustion cycle, and/or increasing the temperature of a heatable ignition element 84.

In this manner, by altering the operation of the ignition element 84 and/or the pilot injector 78, the temperature in the subchamber 72 can be accurately controlled towards the desired setpoint value. The subchamber temperature sensor 106 may then acquire a new reading of the subchamber temperature and this reading may be fed back to the control unit 102. The control unit 102 may then assess from the received data whether the desired temperature setpoint has been reached. If this is not the case, new control signal(s) may be generated for further adjustment. Precise closed-loop control of the subchamber temperature can then be achieved.

It should be understood that the subchamber temperature control module 210 may determine which ones of the above-mentioned control signals to generate in accordance with the engine and aircraft operating parameter measurements received from the engine sensors 104 and, if applicable, the aircraft sensors 108. For instance, if the engine 10 is operating on a cold day, it may be desirable for the temperature of the subchamber 72 to be adjusted by controlling the operation of the ignition element 84 rather than that of the pilot injector 78. In this case, the subchamber temperature control module 210, upon receiving a measurement of the temperature at the engine's input from the engine sensors 104, may determine that only the intensity control signal is to be generated for output to the ignition element 84. In other cases, the measurements received from the engine sensors 104 and the aircraft sensors 108 may indicate that it is desirable for the subchamber temperature to be controlled via the pilot injector 78 only or alternatively via both the ignition element 84 and the pilot injector 78 for additional precision. The subchamber temperature control module 210 may therefore generate the corresponding control signals accordingly. It should also be understood that additional control signals may be generated to control the subchamber temperature. For instance, although not illustrated, it should be understood that the control unit 102 may output control signal(s) to the main injector 42 so that the control parameters thereof may be altered to achieve the desired subchamber temperature.

In one embodiment, the receiving module 202 may be also adapted to detect a transient mode of operation of the engine 10, for example on the basis of the measurements received from the engine sensors 104 and, if applicable, the aircraft sensors 108 and/or when a given control is actuated by a user (e.g. actuation of throttle in an aircraft). When such a mode is detected, the receiving module 202 may send the aircraft/engine sensor signal to the feedforward module 206. The latter may then introduce additional compensation element to anticipate a response of the engine 10 operating in the transient mode. For instance, in the transient mode, a rapid throttle movement commanded by a pilot of the aircraft may result in additional power being requested by the engine 10. In this case, in order to control the temperature of the subchamber 72, it may be desirable to anticipate the engine's response. For this purpose, the feedforward module 206 may therefore predict the quantity and the timing of fuel that should be injected by the pilot injector 78 with the engine 10 in transient mode. The feedforward module 206 may then output to the subchamber temperature control module 210 a signal indicative of the predicted values. The subchamber temperature control module 210 may then take into account the predictions of the feedforward module 206 in generating the control signal(s) for adjusting the temperature of the subchamber 72, thereby achieving optimum control. In particular, the subchamber temperature control module 210 may generate the control signal(s) so as to ensure that, in the transient mode, the subchamber temperature remains as close as possible to the setpoint computed by the setpoint computation module 204.

Referring now to FIG. 4, a method 300 for closed-loop control of the subchamber temperature of the engine 10 will now be described. The method 300 comprises receiving at step 302 operating parameter measurements from the aircraft/engine sensor(s), as discussed above with reference to FIG. 2. The method 300 further comprises receiving at step 304 a present measurement of the subchamber temperature from the subchamber temperature sensor. The subchamber temperature setpoint may then be computed at step 306 on the basis of the received operating parameter measurements. A difference between the computed setpoint and the present subchamber temperature measurement may then be computed at step 308. Optionally, the next step 310 may then be to determine, e.g. from the operating parameter measurements, whether the engine is operating in transient mode. If this is the case, feedforward logic may be applied at step 312 to anticipate the engine's response in the transient mode and predict the quantity and timing of fuel injections, as discussed herein above. At least one subchamber temperature control signal may then be output at step 314. Such signal(s) may comprise an intensity control signal for controlling the intensity of the ignition element, an injector quantity control signal for controlling the quantity of fuel injected by the pilot injector, and an injector timing control signal for controlling the timing of the pilot injector's fuel injections. If it was determined at step 310 that the engine is not in transient mode, or if steps 310, 312 are omitted, the method 300 may flow directly to the step 314 of outputting the control signal(s). As discussed above, upon receiving the control signal(s), the ignition element and/or the pilot injector of the engine may modify their operation in order to reach the temperature setpoint computed at step 306.

The teachings herein are applicable to many rotary engine types, and not just Wankel engines. In a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein. In another particular embodiment, the rotary engine may be an oscillatory rotating engine, including two or more rotors rotating at different angular velocities, causing the distance between portions of the rotors to vary and as such the chamber volume to change. In another particular embodiment, the rotary engine may be a planetary rotating engine having a different geometry than that of the Wankel engine, such as for example a planetary engine having a rotor cavity with an epitrochoid profile defining three lobes and a rotor with four apex portions. Examples of such non-Wankel rotary engines are shown in Applicant's U.S. application Ser. No. 13/750,523 filed Jan. 25, 2013, the entire contents of which is incorporated by reference herein. Other rotary engines geometries are also possible.

The teaching herein as also applicable to other types of internal combustion engines having a pilot subchamber for ignition, such as for example reciprocating engines.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method for controlling a temperature in a pilot subchamber for pilot injection of fuel in an internal combustion engine, the method comprising:
via a control unit,
receiving, from at least one engine sensor, at least one first measurement of at least one engine operating parameter;
receiving, from a subchamber temperature sensor, a second measurement indicative of an actual value of the temperature in the subchamber;
determining, from the at least one first measurement, a setpoint for the temperature in the subchamber, the setpoint corresponding to a temperature level to be achieved for causing ignition of fuel within the subchamber;
comparing the actual value of the temperature in the subchamber to the setpoint;
generating, responsive to detecting a difference between the actual value of the temperature in the subchamber and the setpoint, at least one control signal comprising instructions to adjust the present temperature in the subchamber towards the setpoint; and
sending the at least one control signal to the engine to control the temperature in the subchamber towards the setpoint and accordingly control ignition of the engine.

2. The method as defined in claim 1, wherein the internal combustion engine is a rotary engine coupled to an aircraft, the method further comprising, via the control unit, receiving, from at least one aircraft sensor, at least one third measurement of at least one aircraft operating parameter, and the setpoint for the temperature in the subchamber is determined from the at least one first measurement and the at least one third measurement.

3. The method as defined in claim 2, further comprising, via the control unit, computing a difference between the setpoint and the actual value of the temperature and generating the at least one control signal on the basis of the difference.

4. The method as defined in claim 2, wherein, via the control unit, generating the at least one control signal comprises generating at least one of an injector quantity control signal for modifying a quantity of fuel injected into the subchamber by a pilot injector of the engine and an injector timing control signal for modifying a timing of a fuel injection by the pilot injector, the method further comprising detecting a transient mode of operation of the engine from the at least one first measurement and the at least one third measurement, predicting the quantity of the fuel and the timing of the fuel injection required for adjusting the actual temperature towards the setpoint, and generating the at least one control signal accordingly.

5. The method as defined in claim 1, wherein, via the control unit, generating the at least one control signal comprises generating an intensity control signal comprising instructions for modifying an intensity of an ignition element coupled to the subchamber in order to adjust the temperature in the subchamber towards the setpoint.

6. The method as defined in claim 1, wherein, via the control unit, generating the at least one control signal comprises generating at least one of an injector quantity control signal comprising instructions for modifying a quantity of fuel injected into the subchamber by a pilot injector of the engine in order to adjust the temperature in the subchamber towards the setpoint and an injector timing control signal comprising instructions for modifying a timing of a fuel injection by the pilot injector in order to adjust the temperature in the subchamber towards the setpoint.

7. The method as defined in claim 1, wherein, via the control unit, receiving the second measurement comprises receiving the second measurement from the temperature sensor positioned in the subchamber, the actual value of the temperature corresponding to a gas temperature in the subchamber.

8. The method as defined in claim 1, wherein, via the control unit, receiving the second measurement comprises receiving the second measurement from the temperature sensor coupled to a wall of the subchamber, the second measurement representative of the actual value of the temperature of the wall.

9. The method as defined in claim 1, wherein the engine is a rotary engine, and wherein the at least one first measurement comprises at least one of a pressure at an inlet port of the engine, a temperature at the inlet port of the engine, and a speed of rotation of a rotor of the engine.

10. A system for controlling a temperature in a pilot subchamber for pilot injection of fuel in an internal combustion engine, the system comprising:
a control unit operatively coupled to the engine, the control unit comprising
a receiving unit for
receiving, from at least one engine sensor, at least one first measurement of at least one engine operating parameter, and
receiving, from a subchamber temperature sensor, a second measurement indicative of an actual value of the temperature in the subchamber; and
a processing unit adapted to for
receiving the at least one first measurement and the second measurement from the receiving unit,
determining, from the at least one first measurement, a setpoint for the temperature in the subchamber, the setpoint corresponding to a temperature level to be achieved for causing ignition of fuel within the subchamber,
comparing the actual value of the temperature in the subchamber to the setpoint;
generating, responsive to detecting a difference between the actual value of the temperature in the subchamber and the setpoint, at least one control signal comprising instructions to adjust the temperature in the subchamber towards the setpoint, and
sending the at least one control signal to the engine to control the temperature in the subchamber towards the setpoint and accordingly control ignition of the engine.

11. The system as defined in claim 10, wherein the internal combustion engine is a rotary engine coupled to an aircraft, the receiving unit further receives, from at least one aircraft sensor, at least one third measurement of at least one aircraft operating parameter, and the processing unit determines from the at least one first measurement and the at least one third measurement the setpoint for the temperature in the subchamber.

12. The system as defined in claim 11, wherein the receiving unit receives the at least one second measurement representative of a speed of the aircraft.

13. The system as defined in claim 11,
wherein the processing unit generates the at least one control signal as an injector quantity control signal for modifying a quantity of fuel injected into the subchamber by a pilot injector of the engine and as an injector timing control signal for modifying a timing of a fuel injection by the pilot injector, and
wherein the processing unit further detects a transient mode of operation of the engine from the at least one first measurement and the at least one third measurement, to-predicts the quantity of the fuel and the timing of the fuel injection required for adjusting the temperature towards the setpoint, and generates the at least one control signal accordingly.

14. The system as defined in claim 10, wherein the processing unit computes a difference between the setpoint and the actual value of the temperature and generates the at least one control signal based on the difference.

15. The system as defined in claim 10, wherein the processing unit generates the at least one control signal as an intensity control signal comprising instructions for modifying an intensity of an ignition element coupled to the subchamber in order to adjust the temperature in the subchamber towards the setpoint.

16. The system as defined in claim 10, wherein the processing unit generates the at least one control signal as an injector quantity control signal comprising instructions for modifying a quantity of fuel injected into the subchamber by a pilot injector of the engine in order to adjust the temperature in the subchamber towards the setpoint.

17. The system as defined in claim 16, wherein the processing unit generates the at least one control signal as an injector timing control signal comprising instructions for modifying a timing of a fuel injection by the pilot injector in order to adjust the temperature in the subchamber towards the setpoint.

18. The system as defined in claim 10, wherein the receiving unit receives the second measurement from the temperature sensor positioned in the subchamber, the actual value of the temperature corresponding to a gas temperature in the subchamber.

19. The system as defined in claim 10, wherein the receiving unit receives the second measurement from the temperature sensor coupled to a wall of the subchamber, the second measurement representative of the actual value of the temperature of the wall.

20. The system as defined in claim 10, wherein the engine is a rotary engine, the receiving unit receives, from the at least one engine sensor, the at least one first measurement comprising at least one of a pressure at an inlet port of the engine, a temperature at the inlet port of the engine, and a speed of rotation of a rotor of the engine.

* * * * *